Patented July 31, 1951

2,562,534

UNITED STATES PATENT OFFICE 2,562,534

CHEMICAL MODIFICATION OF PROTEINS

John Robert Coffman, St. Paul, Minn., assignor to General Mills, Inc., a corporation of Delaware No Drawing. Application September 25, 1947, Serial No. 776,149

13 Claims. (Cl. 260—8)

The present invention relates to the modification of proteins by means of compounds having an unsaturated group. such as methyl acrylate and acrylonitrile.

Proteins are employed widely in industry for adhesive coatings, fibers, films and the like. Certain animal proteins such as casein have been found to have properties which render them particularly useful for such purposes. On the other hand, the various vegetable proteins such as gluten, soy protein, zein, and the like, have been inferior in respect to many of these properties, and accordingly have not enjoyed as wide an application as have animal proteins such as casein.

It has now been found that it is possible to modify proteins so as to improve their properties for application in the uses referred to above. For example, it is possible to modify vegetable proteins, such as gluten, so as to make them as good as the animal proteins, and in some instances even better.

It is, therefore, an object of the present invention to provide novel modified proteins having superior properties to the unmodified protein.

It is a further object of the invention to provide a process of producing such modified protein.

In general, the invention involves the treatment of proteins with compounds having a vinyl grouping, and preferably those which have in addition another unsaturated linkage particularly acrylonitrile and methyl acrylate. The exact nature of the reaction which takes place is not known, but it is possible that the unsaturated compounds add to the active group of the protein such as amino groups, hydroxyl groups, and the like, in such a manner as to incorporate unsaturated compounds into the protein molecule. However, it is not desired to limit the invention to any particular theory of operation, as it has been definitely observed that under the conditions set forth, there is a definite improvement in the properties without respect to the particular mechanism involved in the reaction. Furthermore, it has been established that the reaction product of a protein and acrylonitrile has a higher percentage of nitrogen than the original protein, indicating some type of reaction has taken place.

For purposes of illustration, the invention will be described with particular reference to wheat gluten and acrylonitrile. It will be apparent, however, as more fully pointed out hereinafter, that numerous variations are possible in the invention. Wheat gluten, preferably in the form of freshly washed and isolated wheat gluten, is mixed with an aqueous alkaline solution until the alkaline solution is thoroughly distributed throughout the mixture and a smooth homogeneous mass results. Acrylonitrile is then added and the reactants mixed for an extended period of time, for example, five minutes to one hour, at room temperature. The reaction mixture may then be neutralized, for example, down to a pH of about 6.0, by means of any suitable acid; thereafter, the modified protein is washed with water for the purpose of removing electrolytes and other soluble materials. After washing, the product may be drained to remove excess water and then dried.

Wheat gluten thus modified is found to possess greatly modified properties as compared with the untreated gluten. One of the uses to which proteins are widely put is in paper coating operations. The proteins are used as an adhesive to bind various clays and other coatings to the surface of papers. One method of testing the strength of such coatings is the so-called "Pick" test. This test involves the application of molten wax to the coating to be tested, after which the wax is allowed to solidify. The wax is then pulled from the paper and the coating is scored on the basis of whether or not the wax pulls the coating from the surface of the paper.

Unmodified wheat gluten ordinarily has a Pick test value of less than about 2, whereas other proteins, such as casein, may have a Pick test value of somewhere in the neighborhood of 8 or 9. The wheat gluten modified as described above is found to have a Pick test value in excess of 7, and in most instances the true Pick test value was not ascertained as the modified protein adhered so strongly to the paper that the paper actually failed before the coating was removed.

An additional change which is noted in the modified gluten is its dispersibility in aqueous solutions of acids, alkalis, and alcohol. One disadvantage connected with the use of most proteins is the difficulty of dispersing the proteins in aqueous media. It has been found that the protein modified as herein described is readily dispersible to a very high degree in aqueous media other than at the isoelectric point, and in aqueous alcohol. This will appear more fully hereinafter in connection with the specific examples.

The following specific examples will serve to illustrate the invention.

EXAMPLE 1

750 gms. of freshly washed wet gluten were placed in a small double arm mixer (Brabender) and 31 ml. of 40% NaOH were added. The alkaline solution was well mixed into the gluten for a period of 5 min. at room temperature. At the end of this time the gluten appeared as a smooth homogeneous mass. To the alkali protein there was then added 62 ml. of acrylonitrile, the mixer was covered and the reactants were mixed at room temperature for a period of 60 min. To the reaction mixture there was added 25 ml. of 12 N HCl in order to lower the pH from approximately 11.0 down to 6.0. The acid was well mixed into the modified protein for a period of 10 min. While mixing was continued water was constantly run in and out of the mixer for the purpose of washing out electrolytes and other soluble materials. After washing the product for a period of 30 min., the excess water was drained off and the product which appeared as a plastic water resistant mass was drum dried.

A control on the example was made using identical conditions as to concentrations of alkali, acid and times of treatment, but in the absence of any acrylonitrile. This control product could not be washed in the mixer because the material disintegrated into a finely divided form. Therefore, the washing was carried out by suspending the treated gluten in water and collecting the product by centrifugation. This control was drum dried in a manner similar to the acrylonitrile treated product.

The following table illustrates the difference in the nitrogen dispersibility of the treated and untreated glutens. This nitrogen dispersibility is determined by dispersing a given quantity of protein in the media indicated, separating any undispersed material, and determining the percentage of original material which had been dispersed.

TABLE I

| pH of Solution | Percent of total nitrogen which was dispersed | | Percent by weight of ethanol | Percent of total Nitrogen Dispersed | |
|---|---|---|---|---|---|
| | CN Gluten | Control Gluten | | CN Gluten | Control Gluten |
| 3 | 87.7 | 36.0 | 50 | 94.6 | 40.0 |
| 4 | 49.5 | 31.0 | 60 | 93.7 | 37.5 |
| 5 | 14.5 | 25.5 | 70 | 84.1 | 28.9 |
| 6 | 7.8 | 18.0 | 80 | 31.6 | 5.9 |
| 7 | 30.0 | 4.8 | 90 | 1.1 | 0.2 |
| 8 | 83.0 | 18.0 | | | |
| 9 | 89.5 | 31.0 | | | |
| 10 | 96.0 | 43.5 | | | |

From the values in Table I it is readily seen that the reaction of acrylonitrile with gluten results in a product having a greatly increased dispersibility in aqueous solution of acid, alkali and alcohol as compared with those of the control gluten preparation.

The following table illustrates the change in the adhesive characteristics of gluten after its reaction with acrylonitrile.

TABLE II

Wax Pick test values of treated and untreated glutens

| Material | Pick Test Value (Base coating stock) (Protein as 12% of clay) |
|---|---|
| Control Gluten | $<2$ |
| CN Gluten | (PF) $>7$ |

(PF) = Paper Failed.

In the preceding example, the alkali concentrations and acrylonitrile concentrations were used to the extent of 5% and 20% of the dry weight of the protein respectively. Considerable variation is possible in these concentrations. For example, it has been found that alkali may be varied from 1% to 5% of the dry weight of the protein and even higher. Likewise acrylonitrile may be varied from a few percent, such as 2 or 3, up to 20% or more of the dry protein weight. The following tables will illustrate some of the effects on the properties of the modified gluten produced by the variations of concentrations of these reagents.

TABLE III

Effect of varying NaOH concentration on adhesive characteristic of cyanoethyl gluten

| NaOH as Percent of Dry Weight of Gluten | Wax Pick Test Value |
|---|---|
| 1 | 6 PF |
| 2 | 10 PF |
| 3 | 9 PF |
| 4 | 8 PF |
| 5 | 6 PF |

TABLE IV

Effect of varying acrylonitrile concentration in conjunction with NaOH used at 3% of dry gluten weight

| Acrylonitrile as Percent of Dry Weight of Gluten | Wax Pick Test Value |
|---|---|
| 0 | $<2$ |
| 3 | 8 |
| 6 | 6 |
| 9 | 8 PF |
| 12 | 8 PF |
| 15 | 8 PF |

From the above tables it may be observed that the amounts of NaOH and acrylonitrile may be varied widely and still greatly increase the adhesive characteristic of the gluten. In instances where the paper failed, the actual pick test value is not known. However, in those cases the clay coating was bonded to the paper with sufficient strength so that the paper was ruptured while the coating paper bond remained intact.

EXAMPLE 2

750 g. of freshly washed wheat gluten were treated for five minutes with 62.5 cc. of 5 N NaOH (the NaOH is equal to 5% of the dry weight of the gluten). To this mixture there was then added 28 cc. of acrylonitrile (the acrylonitrile was equal to 9% of the dry weight of the gluten). Mixing was continued for 15 minutes, after which 60 cc. of 5 N HCl were added. The resultant mixture was agitated for 10 minutes after which the material was found to have a pH of 5.92. Mixing was then continued and tap water was added to the material in the mixer and the product then was washed for 30 minutes. Thereafter the product was drum dried. The pick test as a paper coating was determined by employing it in a clay coating in which the modified gluten constituted 12% of the weight of the clay. In this test it was found to have a pick test of 11 on bond paper, whereas a control gluten subjected to the identical process, except that no acrylonitrile was used, had a pick test of 3 under the same circumstances.

EXAMPLE 3

750 g. of freshly washed wheat gluten was treated for five minutes with 62.5 cc. of 5 N NaOH. Thereafter 7.9 cc. of methyl acrylate was added to the mixture and mixing was continued for 15 minutes. Thereupon 47 cc. of 5 N HCl was added and mixing continued for ten minutes to bring the material to a pH of 5.99. The material was further processed as in Example 2 to produce the material having a pick test on bond paper of 11 with paper failure, as compared with a pick test of 8 without paper failure from the control.

It should be pointed out that these tests were conducted on bond paper inasmuch as the only base coating stock available resulted in paper failure at around a pick test of 9–10. It will be apparent that individual pick tests vary somewhat from an average, but in general, it has been found that control gluten has a pick test of from 5–6 on bond stock, as an average, whereas the acrylonitrile and methyl acrylate treated glutens have had an average pick test of 11 or higher.

While the invention has been described with particular reference to gluten, it is apparent that it is applicable to proteins in general. In fact Example 1 has been duplicated with a number of other proteins. The only difference in the process is that the adjustment of pH after the reaction is conducted to the isoelectric point of the particular protein being treated. It has been found that this reaction is applicable to such proteins as casein, zein, guar embryo protein, soy protein, peanut protein, cotton seed protein, gliadin, and glutenin. The reaction is found to proceed in each instance to produce products having varying properties, depending on the particular protein employed.

While various modifications of the invention have been described, it is to be understood that the same is not limited thereto, but may be varied within the scope of the following claims.

I claim as my invention:

1. A modified protein comprising the product of the reaction under aqueous alkaline conditions of a protein and a compound selected from the group consisting of acrylonitrile and methyl acrylate.

2. A modified gluten comprising the product of the reaction under aqueous alkaline conditions of gluten and a compound selected from the group consisting of acrylonitrile and methyl acrylate.

3. A modified protein comprising the product of the reaction under aqueous alkaline conditions of a protein and a compound selected from the group consisting of acrylonitrile and methyl acrylate in the proportion of from about 2–20% of said compound based on the dry weight of the protein.

4. A modified gluten comprising the product of the reaction under aqueous alkaline conditions of gluten and a compound selected from the group consisting of acrylonitrile and methyl acrylate, in the proportion of from about 2–20% of said compound based on the dry weight of the gluten.

5. Process of modifying protein which comprises reacting a protein under aqueous alkaline conditions with a compound selected from the group consisting of acrylonitrile and methyl acrylate.

6. Process of modifying gluten which comprises reacting gluten under aqueous alkaline conditions with a compound selected from the group consisting of acrylonitrile and methyl acrylate.

7. Process of modifying protein which comprises reacting a protein with a compound selected from the group consisting of acrylonitrile and methyl acrylate, in the presence of an aqueous alkali in the relative proportion of about 2–20% of said compound based on the dry weight of the protein.

8. Process of modifying gluten which comprises reacting gluten with a compound selected from the group consisting of acrylonitrile and methyl acrylate in the presence of an aqueous alkali in the relative proportion of about 2–20% of said compound based on the dry weight of the gluten.

9. A process comprising reacting acrylonitrile with an aqueous alkaline dispersion of protein.

10. The process of claim 9 in which the protein is soybean protein.

11. A composition comprising the reaction product of acrylonitrile and a protein dispersion in an aqueous alkaline medium.

12. Process according to claim 5 in which the resulting reaction mixture is acidified and washed with water.

13. Process according to claim 6 in which the resulting reaction mixture is acidified and washed with water.

JOHN ROBERT COFFMAN.

REFERENCES CITED

The following references are of record in the file of this patent:

UNITED STATES PATENTS

| Number | Name | Date |
| --- | --- | --- |
| 2,399,084 | Watson | Apr. 23, 1946 |
| 2,406,958 | McQueen | Sept. 3, 1946 |